(12) United States Patent
Chadwick et al.

(10) Patent No.: US 6,421,010 B1
(45) Date of Patent: Jul. 16, 2002

(54) ATMOSPHERIC SONDES AND METHOD FOR TRACKING

(75) Inventors: Russell B. Chadwick; Alexander E. MacDonald, both of Boulder, CO (US)

(73) Assignee: The United States of America as represented by the Secretary of Commerce, Washington, DC (US)

( * ) Notice: Subject to any disclaimer, the term of this patent is extended or adjusted under 35 U.S.C. 154(b) by 0 days.

(21) Appl. No.: 09/784,206

(22) Filed: Feb. 16, 2001

(51) Int. Cl.$^7$ ................................................. G01S 3/02
(52) U.S. Cl. ........................................ 342/465; 342/462
(58) Field of Search .................................. 342/442, 450, 342/462, 463, 465

(56) References Cited

U.S. PATENT DOCUMENTS

| | | |
|---|---|---|
| 4,754,283 A | 6/1988 | Fowler |
| 5,010,343 A | 4/1991 | Andersson |
| 5,053,784 A | 10/1991 | Hippeläinen |
| 5,107,261 A | 4/1992 | Friedman et al. |
| 5,173,690 A | 12/1992 | Friedman et al. |
| 5,317,315 A | 5/1994 | Karhunen et al. |
| 5,347,285 A | 9/1994 | MacDoran et al. |
| 5,379,224 A | 1/1995 | Brown et al. |
| 5,420,592 A | 5/1995 | Johnson |
| 6,081,221 A | 6/2000 | Zrnic et al. |

Primary Examiner—Dao Phan
(74) Attorney, Agent, or Firm—Michael de Angeli

(57) ABSTRACT

A system for wind profiling comprises sondes for being borne through the atmosphere by balloons and transmitting signals enabling identifying the sondes, and received by receivers capable of determining the angle of arrival (AOA) of the signals from the sondes, so that they can be tracked. In the preferred embodiment, the signal transmitted by each sonde is a phase-shift-keyed (PSK) signal. The carrier phase difference as measured at two spaced antennas is measured to provide an accurate but ambiguous measure of the difference in distance of the path length between the sonde and receivers, and the symbol phase difference is employed to remove the ambiguity. The difference in path length is then used to determine AOA. Atmospheric data and the sonde identification are encoded using a psuedo-random sequence (PRS) of the PSK symbols.

14 Claims, 4 Drawing Sheets

ATMOSPHERIC SONDES AND METHOD FOR TRACKING

FIELD OF THE INVENTION

This application addresses methods and devices for measuring atmospheric parameters. More particularly, the invention relates to cost-minimized atmospheric sondes transmitting a signal containing atmospheric data and information from which the sonde position can be determined, and a set of receivers and processors for tracking the trajectory of the sonde as it moves through the atmosphere. Weather information can in turn be determined from the data transmitted by the sondes and by monitoring their paths over time.

BACKGROUND OF THE INVENTION

In general, accurate weather prediction requires measurement of atmospheric parameters, called vertical profiles, in numerous volumes of the atmosphere. These profiles are frequently determined by a balloon- or parachute-borne instrument package, called a sonde, which moves through the atmosphere and transmits atmospheric data measured in situ back to a base station, which may be mobile, airborne or fixed. As the sonde rises or falls and drifts, the trajectory of the sonde is measured by the base station and the wind profile determined from that trajectory.

The present invention allows trajectory measurement using a sonde having only the minimal instrumentation required to acquire the relevant atmospheric data and transmit those data by radio, together with information needed to allow tracking of the sonde. By minimizing and simplifying the instrument suite and transmitter provided in each sonde, this invention has the potential to significantly decrease the cost of the sonde package; cost is important, since, given the difficulty of retrieving and reusing the sondes, they must be considered expendable.

The term "radiosonde" implies a balloon-borne device to measure atmospheric parameters and transmit them by radio to a ground station. If the ground station tracks the device's trajectory to measure the wind, the device is sometimes referred to as a "rawinsonde." The term "dropwinsonde" is completely correct for sondes that are dropped and then tracked to measure winds aloft, but has generally been dropped in favor of the simpler term "dropsonde".

The first dropsondes measured pressure, temperature and humidity and sent these data back to an aircraft for processing into vertical profiles. Since the trajectory of the dropsonde was not measured, wind profiles could not be determined. Later, in the 1970's, dropsondes were developed using the Omega radio-frequency navigation system to provide trajectory data, so that wind profiles could be determined. In the 1980's, the capability to use the LORAN radio-frequency navigation system for tracking sondes increased the vertical resolution of the dropsonde wind profiles. The Omega system has been decommissioned and LORAN will similarly be decommissioned at some future time. Consequently, a new generation of sonde designs has emerged that relies on the Global Positioning System (GPS) to provide very accurate sonde trajectory tracking, but with attendant increases in cost and complexity of sondes, which are still frequently unrecoverable.

A typical GPS-based approach to use of dropsondes for gathering wind information requires the sonde to have the capability either to receive and process GPS signals and to transmit position data to the base station, or, equivalently, the capability to receive and retransmit the GPS signal to the base station for processing there. The former approach is characterized by U.S. Pat. No. 5,347,285 to MacDoran et al. The latter approach, clearly preferred due to the inherently lower costs associated with processing the GPS signals for a number of sondes at a base station rather than in each sonde, is characterized by U.S. Pat. Nos. 5,420,592 to Johnson and U.S. Pat. No. 5,347,285 to Brown et al, differing mainly in the manner in which the relatively high-rate data streams are transmitted. U.S. Pat. No. 4,754,283 to Fowler uses GPS signals to determine the Doppler component of the signal from the drifting airborne sonde, from which the wind information is derived. In each of these prior art approaches the sonde must at minimum be equipped with a GPS receiving antenna and additional electronics. As noted, this adds expense to the frequently unrecoverable sondes.

Another set of references, U.S. Pat. No. 5,107,261 and U.S. Pat. No. 5,173,690 to Friedman et al, U.S. Pat. No. 5,053,784 to Hippelainem and U.S. Pat. No. 5,010,343 to Andersson, propose sonde tracking techniques that do not depend on GPS technology. However, the Friedman patents require additional sonde complexity to produce a separate ranging signal, and the Hippelainem method relies on a set of rotating ground station antennas. Finally, the Andersson device proposes switched sequential processing of signals received by individual antennas and further employs two additional reference antennas. Consequently, none of these references provides the minimal-cost sonde that would be preferred.

Because accurate knowledge of upper atmospheric conditions is becoming increasingly important in weather forecasting, communications, navigation and a host of other endeavors, the number and complexity of the sondes required has risen to a point where the viability and especially the affordability of a broad national or global network depends on economizing advances in sonde and sonde signal reception and processing. The present invention addresses this need.

OBJECTS OF THE INVENTION

A principal object of the invention is to reduce the cost of the sondes by minimizing the parts count to only those necessary, that is, to reduce cost by simplifying the measurement, processing and transmitting requirements placed on the sonde.

It is a corresponding object of the present invention to provide a method for accurately tracking the trajectories of the simplified sondes of the invention.

It is an additional object of the invention to provide a method for extracting sonde position from the data signal transmitted by the minimally-complex sondes according to the invention.

It is yet another object of the invention to provide a simple stacked antenna device adapted to simultaneously receive sonde signals at spaced locations to facilitate the above-cited method.

These and other objects and advantages of the present invention will be made clear from the descriptions and associated figures that follow.

SUMMARY OF THE INVENTION

Broadly, the invention comprises an inexpensive atmospheric sonde and base station weather data measurement system, and the methods of their use. The basic idea of the invention is to minimize the cost of the expendable sonde package by equipping it with only the minimum capability to measure the atmospheric data of interest and to transmit those data together with the minimum additional information necessary for sonde tracking back to a base station that may be fixed, mobile or airborne. Thus, the radio signal transmitted by the sonde is used for two different purposes, first as the carrier of the data, and second as a sounding signal to provide tracking information.

According to the invention, each sonde that is released (termed a "dropsonde" if dropped from a plane, or a "radiosonde" if lifted by a balloon) comprises a transmitter and various weather sensors. The binary data from each sensor is multiplexed together and the resulting bit stream is modulated by a binary pseudorandom sequence (PRS). The resulting signal is then used to control binary phase shift keying (BPSK) of the RF carrier. The PRS can be decoded at a receiver to identify the sonde, allowing it to be tracked over time, and the received signals are processed to determine the angle of arrival (AOA) of the signal at the base station. The sondes can be tracked from various fixed or moving ground stations, or airborne stations, as appropriate.

The sonde location is determined by a solution that relies on measurement of the carrier phase differences of the received signals at some number of receiving antennas spaced some little distance (i.e., meters) from one another. The difference in carrier phase as measured between pairs of antennas is sufficient to determine the signal's angle of arrival, as measured with respect to a line extending between the two antennas. More specifically, according to an important aspect of the invention, the signal carrier phase difference as detected at the two antennas provides a precise but ambiguous indication of the difference in path length to the sonde; the difference in arrival times of the signal as measured at the two antennae, preferably determined by measuring the difference in time of reception of the transitions in the PRS-keyed signal, is used to remove this ambiguity.

According to an important aspect of the invention, the signal transmitted by a sonde is detected by closely-spaced antennas, and the difference in the identical signal as detected by the spaced antennas is used to derive the AOA of the signal at the antenna. Depending on which of several embodiments of the invention is being considered, this AOA may be the angle in three dimensional space or it may be the elevation angle at the site. In a first embodiment comprising a single base receiver site having at least three closely spaced receiver/antennas, this AOA in three dimensional space is used with the pressure-height value (the relationship between height above the earth's surface and atmospheric pressure) and the base station coordinates to locate the sonde. The sonde location is tracked over time to determine its trajectory, from which the wind profile can them be determined. In a second embodiment, multiple time synchronized base stations are employed, each comprising two receiver/antennas that measure elevation angle of arrival (EAOA). These EAOA measurements, combined with the time of arrival (TOA) differences, allow determination of sonde trajectory and velocity without reliance on pressure measurements.

The employment of several such widely separated but time synchronized multi-receiver sites supports an unambiguous method for tracking sonde trajectories without the costly constraint of requiring in situ pressure measurement or employing on-board GPS-based location technology and transmission thereof by the sonde.

BRIEF DESCRIPTION OF THE DRAWINGS

The invention will be better understood if reference is made to the accompanying drawings, in which.

DETAILED DESCRIPTION OF THE PREFERRED EMBODIMENTS

As mentioned above, the basic objective of the invention is to provide the least costly sondes that are capable of providing the information needed for atmospheric profiling, and the corresponding base stations. In one embodiment of the invention the sonde is arranged to be supported by a balloon at (or near) a given pressure height (that is, at the varying height corresponding to a given value of the atmospheric pressure), and to be borne along by the wind. As such a sonde is at a fixed pressure height, it need not comprise a pressure sensor, nor the circuitry needed to encode pressure measurement as part of a signal; the sonde's position needed merely be tracked to monitor the winds at the pressure height of interest. Hence the sonde need merely transmit a sounding or identification signal to enable it to be tracked.

In another embodiment, the sonde either rises through the atmosphere, or is dropped through it; in this case, it typically comprises a pressure sensor and the associated circuitry, as then the pressure information is correlated with the trajectory information to develop wind profiles.

In another embodiment, the sonde rises up through the atmosphere and is tracked by a multi-site ground-based network; in this case a pressure sensor is not required on the sonde, and may or may not be provided.

In any case, of course, the sonde can comprise information for measuring other atmospheric parameters of interest, e.g., temperature and humidity, and for encoding these on the signal transmitted.

The invention includes each of these alternatives.

The invention also contemplates several alternative implementations of the "base stations" which receive and analyze the signals from the sondes, and several alternatives for the devices for releasing the sondes into the atmosphere. As to the former, the base stations can be fixed ground locations, can be mobile, e.g., on trucks or the like, can be airplane-borne, or can themselves be carried by balloon; in a particularly intriguing implementation of the invention now under study and known as the Global Air-ocean In Situ System ("GAINS"), a large number of sondes are carried aloft and deployed at intervals from a large, unmanned, balloon-borne gondola, which also carries a number of antennas for receiving the signals from the sondes, analyzing their position, and retransmitting the trajectory information thus derived to a ground station for analysis by meterologists.

Figures 1, 2:
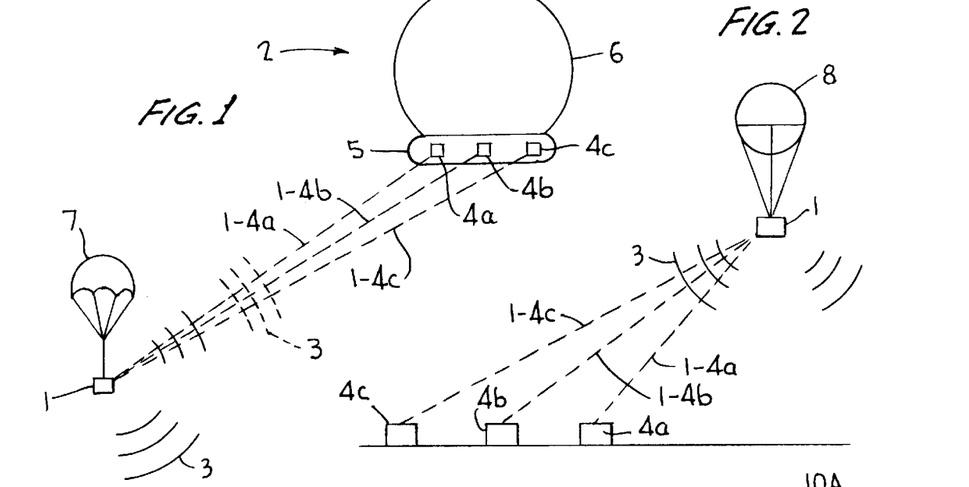
FIG. 1 is a schematic view in elevation of a dropsonde embodiment of a single site multiple receiver trajectory tracking system according to the present invention, wherein the sonde signal is received by a base station carried on a ballon, analyzed to determined the sonde trajectory, and the sonde trajectory information retransmitted.
FIG. 2 is a schematic view in elevation of a radiosonde embodiment of a single site multiple receiver tracking system according to the present invention.

Thus, the system of the invention as implemented in a first preferred embodiment is shown schematically in FIG. 1, which represents the case of an expendable parachute-borne sonde 1 released from an airborne platform 2 (thus a dropsonde) consistent with the proposed GAINS concept, a network of high altitude, remotely controllable globe circling balloon-borne platforms 2 which both release sondes at intervals and track their progress as they fall slowly through the atmosphere. Sonde 1 comprises an instrumentation package for taking in situ atmospheric readings and transmitting these readings to the base station comprised by platform 2. In this embodiment the data signal 3 transmitted by the sonde 1 is received by three or more antennas 4a, 4b, and 4c spaced on a gondola 5 supported by high altitude balloon 6 of platform 2, so that in this arrangement, the gondola with affixed antennas performs as the base station. Alternatively, the antennas can be affixed to the balloon 6. As indicated, the descent of the sonde is slowed by the deployment of parachute 7.

In a second embodiment, shown schematically in FIG. 2, an expendable instrumentation sonde 1 is released from the surface and carried aloft by a lighter-than-air balloon 8. The geometry is then reversed and the base station, comprising at least three spaced antennas 4a, 4b, and 4c for receiving the sonde transmitted data signal 3, is now on the surface rather than on an airborne platform.

In the first embodiment, according to this invention the spacing between the three (or more) receiving antennas 4a, 4b, 4c creates finite differences in the path lengths 1-4a, 1-4b and 1-4c between the transmitting sonde and the receiving antennas, which produce measurable differences in the phase of the signals received. The method by which these phase differences are used to calculate the location of the sonde relative to the antennas, as well as the receivers employed to do so, are important aspects of the invention, as will be discussed below.

In the discussion to follow, it is assumed that the base station is either on the surface looking up or on the airborne platform looking down and the word "sonde" is to be taken to be inclusive of dropsonde or radiosonde, respectively. Moreover, the base station at which the transmissions from the sonde are received can be fixed or mobile, e.g. airborne. Each of these alternatives should be considered to be within the scope of the invention. The desirability of minimizing the cost of the generally unrecoverable sonde is a principal focus of the invention in each case.

As noted above, sonde altitude can be determined per se, that is, geometrically, or can be referenced to a pressure height, that is, to a given pressure. The pressure height defines the relationship between atmospheric pressure and the height or altitude above sea level, such that an in situ pressure value coupled with actual knowledge of the pressure at various latitudes (obtained for example by dropping a more complex sonde) yields an accurate estimate of the corresponding sonde altitude. Both alternatives are within the invention. Moreover, it is within the invention to employ sondes which comprise pressure sensors and also to employ sondes which do not. In the following, for completeness, the case in which the sonde comprises a pressure sensor is treated in detail. The most common approach is to use pressure height obtained by an in situ pressure sensor integral to the sonde, so only altitude determination with a pressure sensor will be considered in detail first. The combination of this altitude with the precisely and unambiguously determined angle of arrival (AOA) information determined according to the invention provides sufficient information to track the sonde trajectory.

As noted above, an important object of this invention is to provide an expendable sonde having the minimum amount of instrumentation required to accomplish the job of measuring atmospheric parameters, and transmitting this data along with a signal identifying the sonde and allowing its location to be tracked. According to the invention, the transmitted signal is a binary-phase-shift-keyed (BPSK) signal, comprising a pseudo-random sequence of pulses which enable encoding of the appropriate atmospheric data onto a signal also identifying the sonde, enabling its identification and tracking over time.

Figure 3:
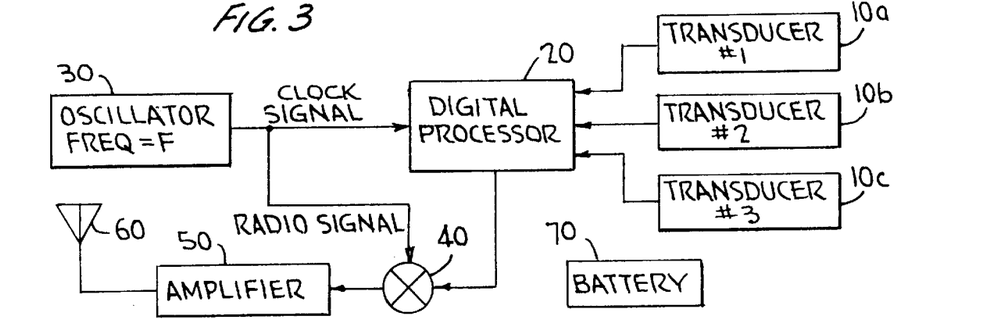
FIG. 3 is a block diagram illustrating the essential components of a minimal sonde.

On a conceptual basis, no pressure-height sonde can be less expensive than the minimal sonde described here. A block diagram of this notional minimal sonde is shown in FIG. 3. This minimal sonde comprises: transducers 10a, 10b, . . . 10n to measure the desired atmospheric parameters; a digital processor 20 to prepare the measured data for modulation onto the radio signal; an oscillator 30 to generate the radio and processor clock signal; a modulator 40 to combine the prepared data and the radio signal; an amplifier 50 to give the modulated signal appropriate power for transmission; an antenna 60 to transmit the modulated signal back to the base station; and a battery 70 to supply power during the measurement phase.

The necessary signal processing at the base station is an important part of this invention, according to which the data-carrying radio signal must be received and analyzed to determine both the data and the AOA. That is, providing suitable base station equipment to analyze and process the received sonde signals is also an important aspect of the invention.

According to one aspect of the invention, the base station does not have the ability to perform radio direction-finding responsive to the signal from the sonde, because to do so would increase the complexity and cost of the sonde. Instead, the data-carrying radio signal is received at several different points at a base station and the measured phase difference between the signals received by each pair of closely spaced antennas is used to determine the angle of arrival, AOA, of the sonde signal at the base station. When this AOA is combined with the sonde altitude derived from the on-board pressure measurement, the precise location of the sonde is determined. The details of the relative phase measurement technique are discussed below in connection with FIGS. 7 and 8.

The general approach is to use a Costas Loop or other such phase sensitive circuit, to track both the carrier phase and the symbol phase of the modulated radio signal at each of the separate small antennas at the base station. The differences in the carrier phase gives an accurate, but ambiguous, measure of the difference in the path length traversed by the signal as received at two closely spaced antennas. The differences in the symbol phase provide information that is used to remove the ambiguity and allow unambiguous determination of the range difference. That is, the signal transmitted by the sonde is such that extremely precise measurements can be made with respect to the distance between the sonde and pairs of antennas, which in turn, is used to mathematically derive an AOA with respect to the pair of antennas. Two such AOAs provide an arc of possible sonde locations; this can be combined with pressure-height measurement of altitude to determine sonde location. In another embodiment, precise measurments of the difference in the time of transmission of the signal to two spaced base stations are made and are combined with the AOA measurements to locate the sonde. In a further embodiment, three AOAs (that is, from three pairs of receiving antennas) can be used to locate the sonde in space, as will be shown subsequently.

Given the unambiguous relative phase measurements between receivers at the receiving stations, there are several algorithmic approaches to estimating the AOA. A relatively simple approach is to take unambiguous relative phase measurements between any three points and use these to reconstruct the constant phase plane of the incoming data-carrying radio signal. A normal, perpendicular, line to this plane then defines the desired angle of arrival line which, when intersected with the pressure height plane, gives the location of the sonde.

Other more complicated approaches to AOA estimation are: the MUltiple SIgnal Classification (MUSIC) algorithm; the Estimation of Signal Parameters via Rotational Invariance Technique (ESPRIT); Capon's Maximum Likelihood Method (Capon's MLM); Pisarenko Harmonic Decomposition (PHD); and the Minimum Norm Method. These alternatives are all described in the literature and are within the skill of the art. The invention presented here could be implemented with any one of these advanced methods of AOA estimation or other equivalent methods.

In the conventional sonde situation, the amount of data to be sent from the sonde back to the base station is relatively small and so a relatively narrow bandwidth signal will suffice. However, according to the present invention this signal is used for two different purposes, data communication and AOA measurement, requiring a wider bandwidth signal, easily obtained through spread spectrum techniques. Thus the signal transmitted from the sonde is a suppressed-carrier, binary-phase-shift-keyed (BPSK) signal with a chipping rate greater than would be required for transmitting only the environmental data back to the base station. As used here, a "chip" is a binary element, or bit, of a random sequence, here of pulses of a given frequency and phase having a specific duration, and the "chipping rate" is a measure of the time it takes to transmit one such chip.

Figure 4:
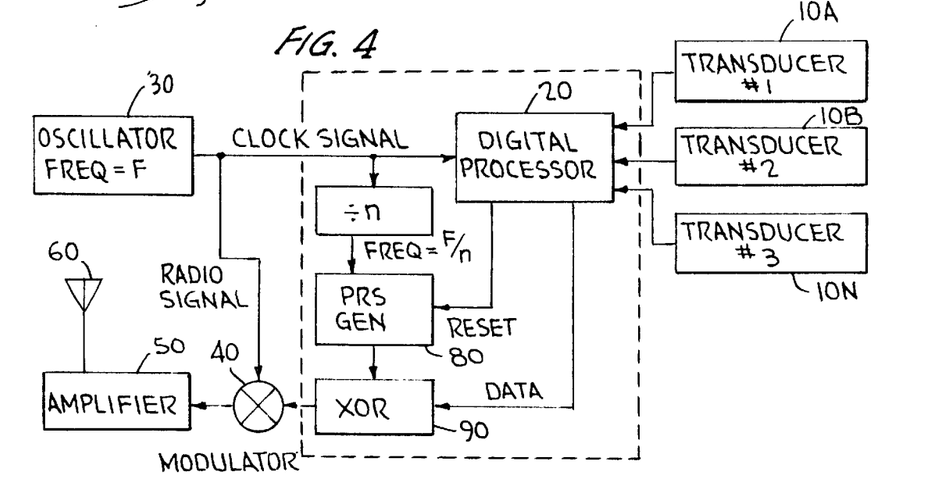
FIG. 4 is a block diagram illustrating the functional electronic components of a sonde according to the present invention.

FIG. 4 shows one possible block diagram of the circuitry of the PRS sonde. The only additional capability required to be added to the minimal sonde referred to above is the added Pseudo-Random Sequence (PRS) modulation, using an Exclusive OR (XOR) operation, of the data signal prior to being modulated onto the radio frequency signal. This allows identification of the transmitting sonde, and requires only minimal added hardware on the sonde. That is, each sonde transmits a BPSK sequence; because they conform to a known PRS sequence, the sequence transmitted by each sonde is distinguishable from the sequence transmitted by all of the other sondes, so that they can be identified. When this invention is reduced to practice using modern electronic techniques, the items inside the dashed lines in FIG. 4 will likely be implemented using a single application specific integrated circuit (ASIC). Accordingly, the parts count for the sonde envisioned here will not increase above that for the minimal sonde, and adding PRS capability will not increase the unit cost.

At the base station, a number of electrically small, separated antennas at different positions in space are used to receive the radio signal from the sonde. In one embodiment (single base station with pressure sensor on the sonde) at least three antennas are needed. In another embodiment (multiple ground-based stations with no pressure sensor on the sonde) only two antennas per base station are needed. Available space and the AOA processing method determine the exact number of antennas and geometric arrangement.

Figure 5:
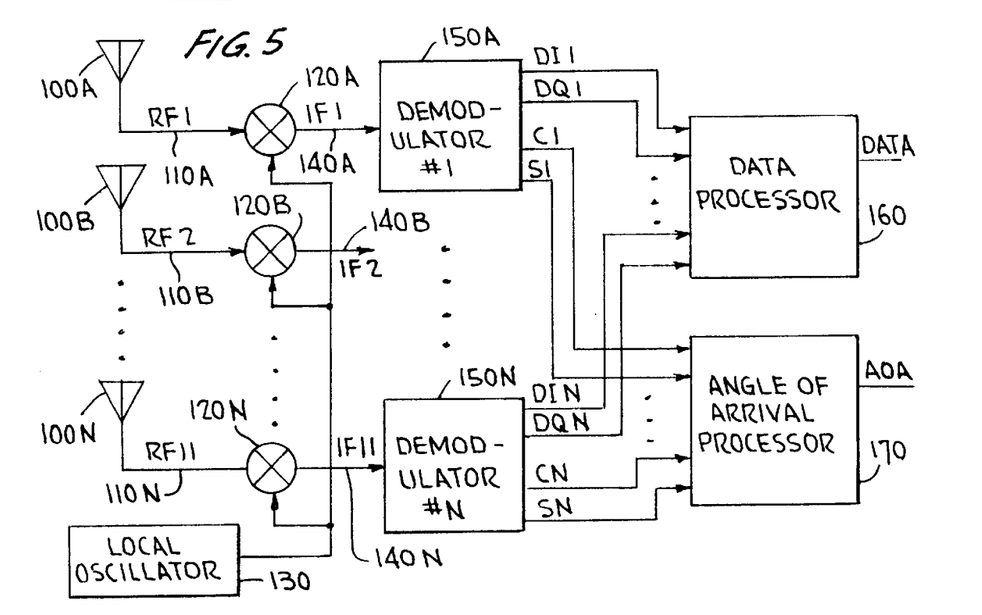
FIG. 5 is a block diagram illustrating the functional components of a base station receiver.

FIG. 5 shows a block diagram of the receiver at the base station. The signals RF1, RF2, . . . RFn from N antennas 100a, 100b, . . . 100n, are fed by equal length cables, 110a, 110b, . . . 110n, into RF mixers, 120a, 120b, . . . 120n. A local oscillator signal from a common oscillator 130 is fed to each mixer with equal phase by using integer wavelength cables. Thus the phase of the intermediate frequency IF signal IF1, IF2, . . . IFn from each RF mixer is determined by the data, by the physical location of the antennas and by the AOA of the radio signal from the sonde. The IF signals pass through equal length cables 140a, 140b, . . . 140n, into demodulators 150a, 150b, . . . 150n where the data contribution is separated from the AOA contribution and passed to a data processor 160 to determine sonde trajectory and the wind profile. Alternatively, the equal length cables could be replaced by calibrated arbitrary lengths of cable.

As shown in FIG. 5, each demodulator 150a, 150b, . . . 150n provides four output signals: In-phase Data, DI, Quadrature-phase Data, DQ, Carrier phase, C, and Symbol delay, S. The two data signals DI and DQ from each demodulator are sent to a data processor 160 that combines the signals from each demodulator 150a, 150b, . . . 150n and removes the same pseudo-random code from each data stream, using the latter to identify the transmitting sonde (the PRS sequences and the identifications of the corresponding sondes being stored by each data processor). Data processor 160 may combine the data streams from each demodulator 150a, 150b, . . . 150n to correct any errors (each demodulator ideally detecting the same data) to arrive at a single data stream containing the environmental data measured at the sonde.

The carrier phase and symbol delay information from each demodulator 150a, 150b, . . . 150n is sent to the AOA processor 170 where carrier phase differences and symbol delay differences for each pair of antennas are determined and used to calculate the AOA of the signal at the receiver, as discussed in detail below. When these differences are taken, the virtual phase reference cancels out to yield only relative phases between the antennas. Also, the effects of oscillator errors are cancelled out.

It may be that the individual demodulators 150a, . . . 150n can be realized with commercial off-the-shelf (COTS) GPS receiver components (although operating at a frequency different from the allocated GPS frequencies), since the signal processing steps involved in detecting the PRS codes and using these to identify a transmitter are similar to the steps used by GPS receivers to identify the transmitting satellites. These GPS receivers would only need to be single channel receivers since only one sonde is of interest at a time. Detailed testing will show whether it is possible to use COTS GPS receiver components for this application.

Figure 6:
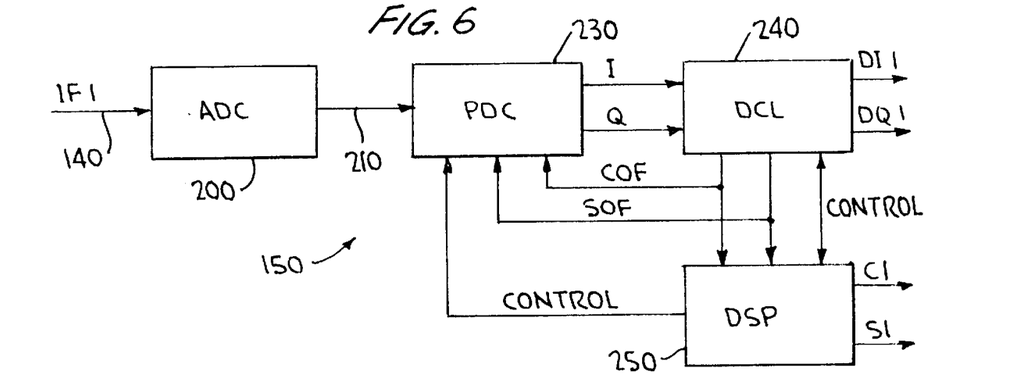
FIG. 6 is a block diagram of a single demodulator as used in the base station.

FIG. 6 shows one possible block diagram of an individual demodulator 150. As noted, there would be N of these in each receiver. Demodulators 150a, . . . 150n may be built on individual boards or on a single board to use available parallelisms of the components. The input IF signal 140 is digitized by a high speed analog to digital converter (ADC) 200. A possible ADC is the Analog Devices AD6640. The digitized output is sent on a parallel bus 210 to a programmable down-converter (PDC) 230 where it is converted down to base band in-phase (I) and quadrature-phase (Q) signals. A possible device for this application is the Intersil HSP0214. The I and Q base band signals contain both the data and the phase information used to determine the AQA. These base band I and Q signals are fed to a digital Costas loop (DCL) 240 which uses internal and external feedback loops to estimate the carrier phase and the symbol delay of the received signal, which are used to recover the base band data signal. A possible device for this is the Intersil HSP50210. The feedback loop signals generated by the DCL are called the carrier offset frequency (COF) and symbol offset frequency (SOF) and form closed feedback loops through the PDC 230. These digital signals are also sent to a digital signal processor (DSP) 250 where the carrier phase (C1) and the symbol delay (S1), both referenced to some virtual point, are determined. In practice, the virtual point will probably be one of the receiving antennas.

The carrier phase difference as measured between two spaced antennas is on the scale of the wavelength of the radio frequency signal transmitted by the sonde. Because the radio wavelength is normally less than the separation between the antennas, this length measurement can be ambiguous; however, using the circuitry described above, the carrier phase difference can be measured very accurately. By comparison, the symbol delay differences depend on the chipping rate of the signal, not on the wavelength of the carrier. If the chipping rate is R chips/sec and the speed of propagation is c m/s, then an individual chip extends over c/R meters of space. Unambiguous measurements of distance can be made over distances of half the extent of an individual chip, i.e. c/2R meters, by detection of symbol delay differences. That is, detection of the transition point between pulses of the PRS sequence at each antenna and measuring their spacing in time gives a rough estimate of the difference in path length between the transmitting sonde and the two antennas; this rough estimate is rendered accurate by the phase difference measured with respect to the carrier wave.

As a result, the carrier phase difference provides a precise but ambiguous measurement of the differing distances of the antennas from the sonde. According to the invention, this difference in distances is combined with the measurement of the symbol phase difference, providing a less precise, but unambiguous, measurement of the same difference distance to yield a highly accurate measurement of the difference in path length. Further, the symbol delay is unambiguous on a scale size of the maximum antenna spacing.

Stated differently, the symbol phase difference provides an unambiguous measurement of the path length difference with respect to the two receiving antennas, but lacks the necessary precision for accurate AOA determination. Combining measurements of carrier phase differences with symbol delay differences according to the invention, however, does provide measurements of sufficient accuracy to allow accurate calculation of the AOA of the signal transmitted by the sonde at the base station.

Several different direction-finding algorithms are suitable for this task, and this invention does not rely on a specific algorithm.

The following is a quantitative description of the method of determining AOA according to the invention. For clarity and simplicity the approach is developed for a two-dimensional case with an interferometer using two antennas and receivers. The expansion to the necessary three dimensions follows directly. That is, the direction finding algorithms available for three dimensions are more complicated; the approach outlined here is useful for illustrating the concept.

Figures 7, 10, 12:
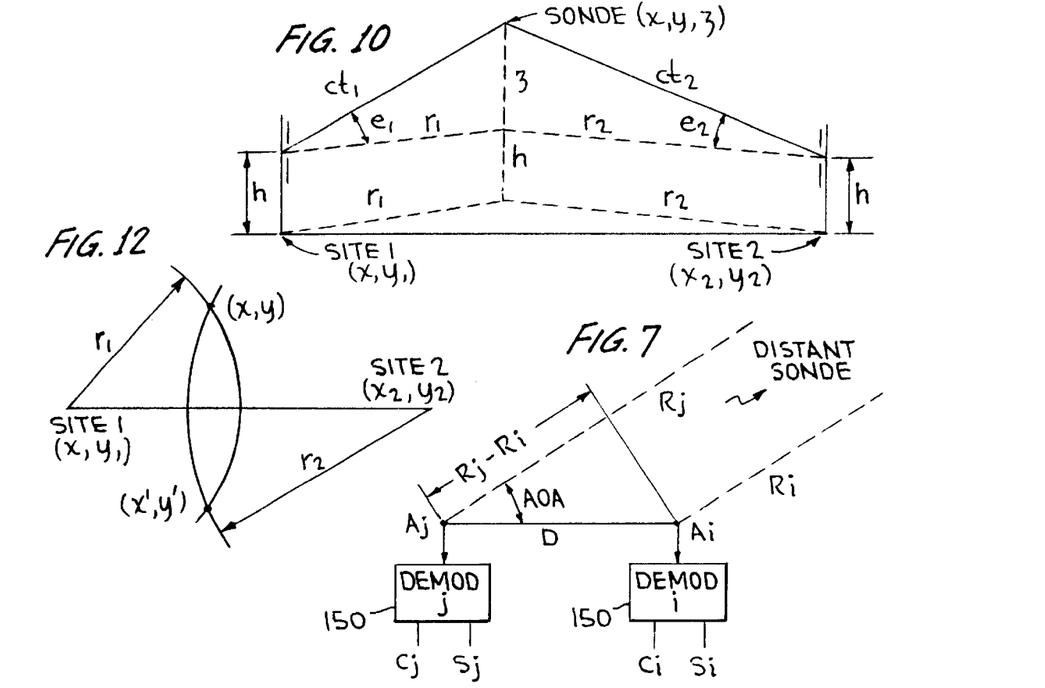
FIG. 7 shows the geometry for the two-dimensional case of angle of arrival (AOA) measurement according to the present invention.
FIG. 10 is a schematic view in elevation of a multiple site radiosonde trajectory tracking system according to the present invention, two receiving stations being shown.
FIG. 12 is a plan view showing the intersections of derived values of r1 and r2 according to the FIG. 10 geometry.

Assume the geometry shown in FIG. 7. Two omnidirectional antennas $A_j$ and $A_i$ are spaced a known distance D from one another. Note that the distance D is less than C/2R, as discussed earlier. A distant sonde is sending a signal that is being received by both antennas. The sonde is $R_j$ and $R_i$ from the antennas respectively, and both of these distances are much greater than D. The difference between these two range values, i.e., $R_j-R_i$, can be used with D to determine the angle of arrival (AOA) by $$AOA = cos^{-1}\{(R_j - R_i)/D\} \qquad (1)$$

The quantity $R_j-R_i$ is determined as follows. The antennas $A_j$ and $A_i$ are connected to receiver/demodulators 150 that measure carrier phase, $C_j$, and symbol delay, $S_j$.

Figure 8:
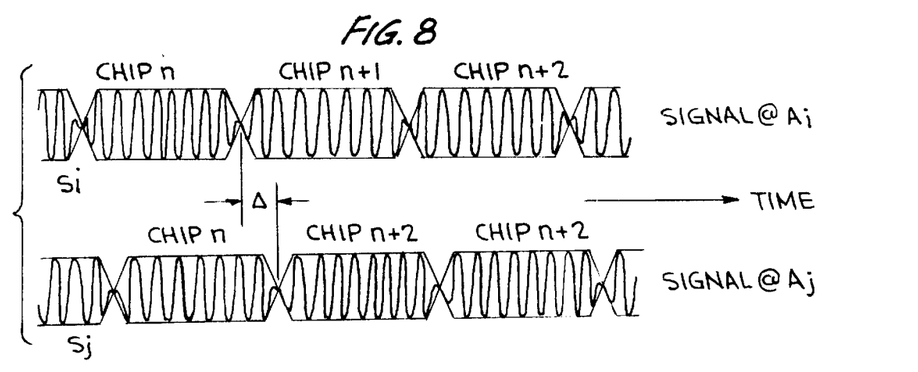
FIG. 8 shows a representation of BPSK signals received at antennas Ai and Aj in the FIG. 7 geometry.

Carrier phase is scaled to [0,1] so that a complete wavelength change causes $C_j$ to change from 0 to 1. The symbol delay $S_j$ is the measured time of detection of the chip boundaries as shown in FIG. 8, i.e., the chip boundary is detected at the time at which one pseudo random binary code bit, or chip, ends and the next begins. The difference in detection time between chip boundaries $\Delta$ is thus proportional to the spacing D between the two antennas; more particularly, $\Delta=[D \cos(AOA)]/c$. Thus, measurement of $\Delta$ allows unambiguous but approximate determination of AOA. Moreover, any clock errors will be cancelled out in the difference operation, since the absolute time of reception is not important to determination of AOA.

The relation between the range to the sonde R and the carrier phase measurement for the jth receiver $C_j$ is $$\lambda(C_j+N_j)=R_j \qquad (2)$$

where $\lambda$ is the wavelength of the carrier signal of any given PRS pulse in meters and $N_j$ is the integer number of wavelengths between $A_j$ and the sonde. This equation simply determines the number of wavelengths (integer plus fractional) between the antenna and the sonde.

The relation between the symbol delay difference, the range difference, and the carrier phase difference is $$c(S_j-S_i)=R_j-R_i=\lambda(C_j-C_i)+\lambda(N_j-N_i) \qquad (3)$$

where c is the speed of electromagnetic propagation and $S_j-S_i$ is the time delay between detection of the chip boundaries at the i-th and j-th receivers, shown in FIG. 8 as $\Delta$. The term following the second equal sign is a measure of the difference in range in equation (2) for the two different antennas. The symbol delay measurement is less accurate than the carrier phase measurement, but the carrier phase is ambiguous and the symbol delay can be used to remove that ambiguity by determining the difference in the number of wavelengths between the two antennas. This difference must be an integer, which can be determined exactly under the right conditions, i.e. high signal to noise ratio.

The nature of the delay lock loops and the phase lock loops (which yield the key range difference measurements) determine the response to sonde dynamics and the performance of the key measurements. Here, both loops are selected to be second order to achieve unconditional stability in these feedback loops. The delay lock loop requires the narrower bandwidth to make the standard deviation of the range measurement difference much smaller than the RF wavelength.

Table 1 below presents representative approximate values for relevant system parameters.

TABLE 1

Important Design Parameters

| Sonde average power | 0.1 W |
| --- | --- |
| Transmit antenna gain | 0 dbi |
| Receive antenna gain | 0 dbi |
| RF wavelength | 0.75 m |
| Chip wavelength | 300 m |
| Receiver noise figure | 3 db |
| RF losses | 1 db |
| Symbol delay loop correlator spacing | ⅛ chip |
| Bandwidth of delay lock loop | 0.8 Hz |
| Bandwidth of phase lock loop | 8.0 Hz |
| Pre-detection integration time | 0.05 sec |
| Allan variance of reference oscillator | $10^{-11}$ |
| Vibration spectral energy | 0.001 $G^2$/Hz |
| Antenna separation | 2 m |

The carrier to noise ratio achieved with the parameter set in Table 1 is more than adequate for proper receiver operation and measurement of the range differences necessary to measure the AOA for this application geometry.

The AOA information derived as above at a single receiver location does not allow location of the sonde in space without more information; since the AOA is measured relative to the line connecting the two antennas, one AOA is sufficient only to locate the sonde somewhere on the surface of a cone of half-angle AOA, centered on that line, and terminating at the receiver location. Given similar AOA information measured at two receiver locations, the sonde can be located anywhere on the intersection of the corresponding conic surfaces; the position of the sonde in space can then be determined from its altitude (determined per se by a pressure sensor and with known information correlating the measured pressure with the actual altitude, or with respect to a pressure altitude simply by the pressure information itself). Alternatively, a third AOA measurement can be used to locate the sonde in space, by triangulation. In an additional alternative discussed in further detail below, the difference in time between the transmission of the signal and its reception at two spaced receivers can be measured accurately, providing a value for the difference in path length between the sonde and the two receivers, and this information used together with the respective AOAs to locate the sonde in space.

Thus, according to a first essential aspect of this invention, the AOA of the data signal at a receiver location is determined by comparison of the carrier phase and symbol phase at two antennas at the receiver location, and this information is used together with other information to locate the sonde precisely in space.

Employing the AOA information derived as above, and tracking variation in AOA and sonde altitude (again, either actual altitude or pressure height) over time, allows determination of the path of the sonde through the atmosphere, and thus determination of the winds, a principal object of the sonde system. The base station position and attitude must be known to infer the sonde position. In the case of a fixed base station on the surface, the position and attitude can be accurately measured by conventional surveying techniques and will not change appreciably with time. As noted above, different pseudo random sequences are coded into the data signals from each different sonde, allowing the sondes to be identified by the receivers and thus tracked over time; this in turn is used to generate wind profile information.

In the case of a mobile base station, the situation is somewhat more difficult as the position and attitude may be changing. Examples of this might be an ocean-going ship or buoy, or a highway truck or railroad car. Determining AOA from an airborne platform like a Global Air-ocean IN-situ System (GAINS) balloon would be even more complex since the relative positions of the receiving antennas would change as the balloon deforms, in addition to the changes in balloon position and attitude, requiring compensation. However, such compensation is well within the skill of the art.

More specifically, the presently preferred approach to solving this problem is to attach a GPS antenna rigidly to each of the small antennas on the GAINS balloon used to receive the sonde signal; these GPS signals are sent to an on-board processor that continually measures and tracks the relative baselines (distance and direction) between each pair of GPS antennas. That is, GPS signals from GPS antennas carried on the balloon itself are used to measure its deformity, if any, and this information then used to correct the AOA information calculated responsive to carrier phase and symbol phase information received from the sondes by a co-located set of antennas. Implementation of this system would be relatively straightforward. If the system were arranged such that the phase centers of the antenna for the sonde signal and the GPS signal are at the same point, or one is spatially referenced to the other in a known way, the relative baselines between each of the antennas for the sonde signal can be determined from the baselines of the GPS antennas. It would then be easy to track these baselines in time, so any mobile platform (even if it deforms, as might the surface of a GAINS balloon) could serve as a base station.

Figures 9, 11:
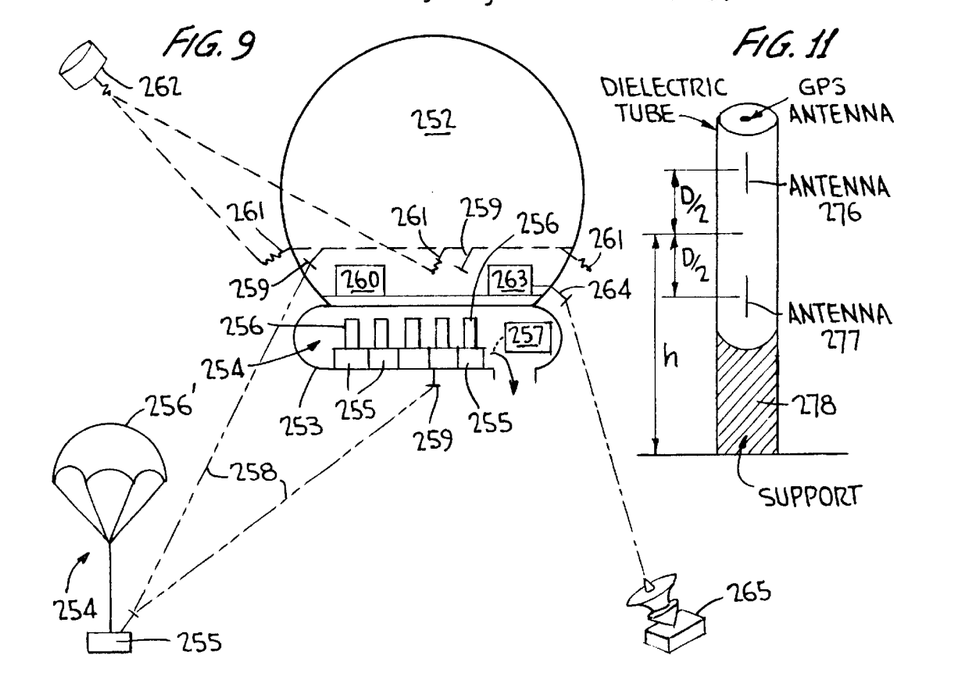
FIG. 9 shows schematically one implementation of a system according to the invention comprising a balloon-borne base station.
FIG. 11 is a perspective view of an antenna pair housing according to one aspect of the present invention.

FIG. 9 shows an exemplary implementation of the system in this embodiment. A GAINS balloon 252, intended to remain aloft at high altitude for on the order of months, comprises a gondola 253 carrying a large number of sondes 254, each comprising an instrument package 255 and a parachute 256. A launch mechanism 257 drops the sondes 254 at predetermined times. After the sondes are launched, their parachutes deploy, as indicated at 256'.

After launch, the sondes 254 transmit meterological data using a specific PRS modulated onto a carrier using BPSK, as discussed above. The signal from the sonde is received by antennas 259; the signals as received by each pair of antennas 259 are processed by a processor 260 as discussed above, i.e., to determine an AOA for the signal received from the sonde with respect to each pair of antennas, by comparing the carrier phase and symbol phase. (It will be appreciated that the signal would reach each of the antennas 259 along essentially parallel paths, as required for the Eq. 1 relation to be accurate; FIG. 9 is distorted in this respect.) The AOAs as determined with respect to each pair of antennas can then be used to calculate the location of the sonde with respect to the balloon-borne base station 252.

The location of the balloon-borne base station 252 would be determined by processor 260 operated as a conventional GPS receiver, that is, to process GPS signals received by GPS antennas 261 from preexisting GPS satellites 262. The sonde location is then modulated onto a carrier signal provided by a separate radio transmitter 263, for transmission via a further antenna 264 to a ground station 265 or a communication satellite. As noted above, GPS antennas 261 can be disposed in juxtaposition to the signal antennas 259, to receive positional signals from preexisting GPS satellites 262; the positional information provided by GPS antennas 261 is then used by processor 260 to ensure that the value for the relative spacing of the signal antennas 259 as used to determine the AOA for each sonde is accurate.

As noted, the location of the sonde 254 with respect to the GAINS balloon-borne base station 252 can be determined by calculations based on AOA information detected with respect to at least three pairs of antennas 259. However, given the relatively short baseline distances between the pairs of antennas 259 mounted on gondola 253, the AOAs thus detected will be very close to one another, making it difficult to determine the location of the sonde based solely on comparison of plural AOAs. However, if the sonde 254 also transmits pressure information, a single value for the AOA can be used to locate the sonde with respect to the pressure plane; further, if accurate values for the pressure at various altitudes are known, the actual altitude of the sonde can be determined similarly. In yet another alternative, if the GAINS balloons are not too widely spaced, AOA information detected at two or more balloons with respect to the same sonde can be processed at the ground station to locate the sonde in space.

Sometimes, sondes drift into atmospheric jets and get carried to great distances from the base station. If the distance becomes large enough, the base station receiver can suffer loss of detectable signal. Then data from the sonde will be truncated; i.e. the profiles only extend over a portion of the atmosphere. Even if there is no loss of signal, the measurement capability of the sonde is significantly reduced because of the small angle between the line defined by the AOA and the horizontal surface defined by the pressure measurement at a great range from the base station. These two problems can be remedied by the use of secondary base stations having the same capability as a primary base station, exemplified in FIG. 9, except without sonde release capability.

Each secondary base station has multiple small antennas and the receivers and processing capability to receive the data signal, recover the data stream, and determine the AOA, as described above. Therefore, even if the radio link from the sonde back to the primary base station is not serviceable, the secondary base station can completely recover the environmental data and the sonde trajectory and then determine the wind profile whenever it can receive a suitable signal. If both the original base station and the secondary base station can receive the data signal, the AOA from both stations can be combined to yield an improved estimate of the sonde position. This eliminates the problem of reduced measurement capability at long ranges referred to above.

The use of multiple base stations would allow sonde cost to be reduced further. The pressure sensor is a cost driver of the expendable sonde package; eliminating that sensor would significantly reduce sonde cost. In one embodiment, described above, pressure measurement is employed, either to determine sonde altitude with respect to a pressure plane, or, by correlation to a known pressure-altitude relationship, to determine actual sonde altitude. However, AOA information from multiple base stations, as noted above, can determine sonde height and location, and thus track sondes and measure winds, without a pressure measurement.

According to a further aspect of the invention, sonde location in space is determined using AOA and time-of-arrival information as detected at two base stations. More specifically, given stable oscillators disciplined to GPS timing pulses, it is possible to have time accurately synchronized at widely separated sites. Both base stations can measure the elevation AOA of the sonde signal, as discussed above, and can accurately determine the time of arrival (TOA) of the start of the PRS code sequence. The difference between these two TOA values defines a hyperboloid (a hyperbolic surface in three dimensions) with foci at the two base stations. This surface can be combined with the elevation AOA from the two base stations to determine the location of the sonde.

The geometry of this implementation of the invention, wherein multiple base stations are employed to locate the sondes in space, is shown schematically in FIG. 10. In this case receivers are located at two widely separated (on the order of 40 kilometers) sites, located at x1, y1 and x2, y2 respectively. Both receivers have both elevation AOA and TOA determination capabilities. For simplicity the two sites are assumed to be located at the same altitude. The sonde has drifted to some location x, y, z, directly over a point on the surface, r1 and r2 meters from the two receivers, respectively.

In a preferred embodiment, the antennas at each receiver site are configured as shown in FIG. 11. Each receiver site comprises two sonde signal-receiving antenna elements arranged vertically and a GPS antenna located on top of the structure. The details of the sonde receiving antennas are less important than that each has identical gain patterns independent of azimuth angle. This could be achieved by vertical dipoles, conformal patch arrays or other antenna technol. It is also important that the line between the phase centers of the two antennas be vertical for all azimuths. In the FIG. 11 embodiment the site comprises a dielectric tube 272 having a GPS antenna 274 affixed to the top, two sonde receiving antennas 276 and 277 coaxially located within the tube and spaced a distance D apart, measured vertically from phase center to phase center, and a support structure 278 in which electronic processing components are housed. Receivers as described previously are used with each of the sonde receiving antennas to determine the carrier phase of the received sonde signal at each and to resolve phase ambiguity, also as previously disclosed. The phase difference and the antenna spacing D are sufficient to determine the elevation AOAs of the received sonde signal at the two receiver sites, shown as e1 and e2 respectively in FIG. 10.

The travel times for the sonde data signal to reach the two receiver sites are t1 and t2 respectively, and hence the distance from the sonde to the two receiver sites is given by ct1 and ct2 respectively, where c is the speed of propagation. The time that the signal was sent is unknown so these values cannot be determined explicitly.

However, the difference between them can be determined if the two sites have time synchronization. With modern GPS time keeping techniques, it is possible to achieve synchronization to within 10 nanoseconds at widely separated sites. If the time of transmission from the sonde is t0, then the times of arrival at the two sites will be t0+t1 and t0+t2 respectively. When the arrival times of transmission of the sonde signal at the two sites are subtracted, the transmission times cancel and d=c(t1−t2) remains, where d is the difference in distances from the sonde to the two sites.

Given three measurements (e1, e2, and d), then the values of z, r1 and r2, as shown in FIG. 10, are determined by solution of the following equations:

$$Z=\sin(e1)*\sin(e2)*[d/(\sin(e1)-\sin(e2)]\quad(4)$$

$$r1=\cos(e1)*\sin(e2)*[d/(\sin(e1)-\sin(e2)]\quad(5)$$

$$r2=\sin(e1)*\cos(e2)*[d/(\sin(e1)-\sin(e2)]\quad(6)$$

The height of the sonde, z, can be determined unambiguously from this set of equations, but the location of the sonde in the x-y plane is determined by the intersection of two circles of radii r1 and r2, as illustrated in FIG. 12. In general, the two circles will intersect in two different locations, as shown at x, y and x', y'. Note that as long as the base stations are on the ground and the sonde in the sky, the sonde vertical coordinate z is the same in both solutions, so that only x, y and x', y' need be discriminated; in circumstances where the sonde might be higher or lower than either base station, z' will also be required to be discriminated.

Figure 13:
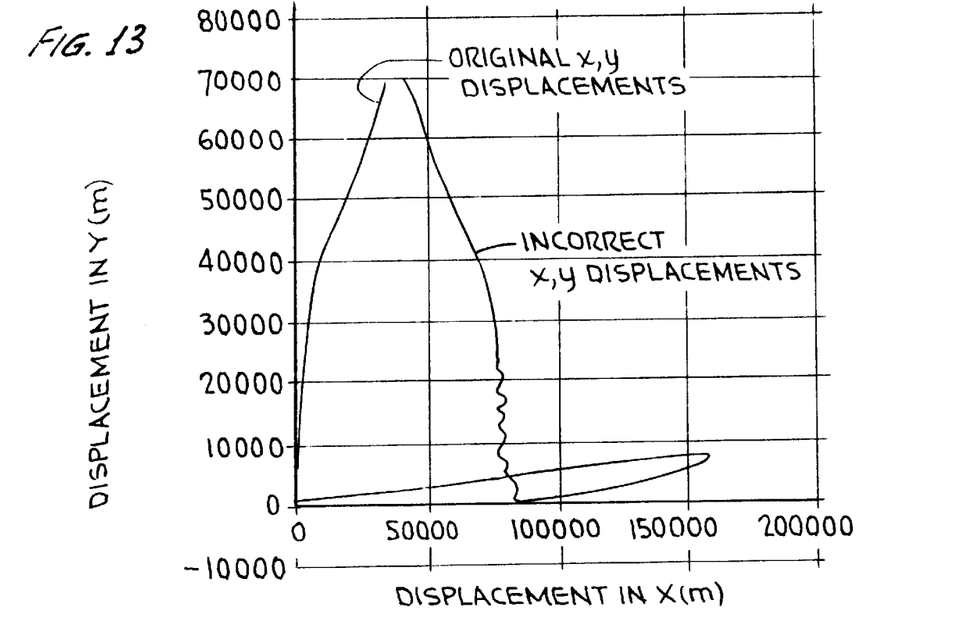
FIG. 13 is an x-y plot of incorrect values of x, y displacements determined from one pair of receiver sites.
Figure 14:
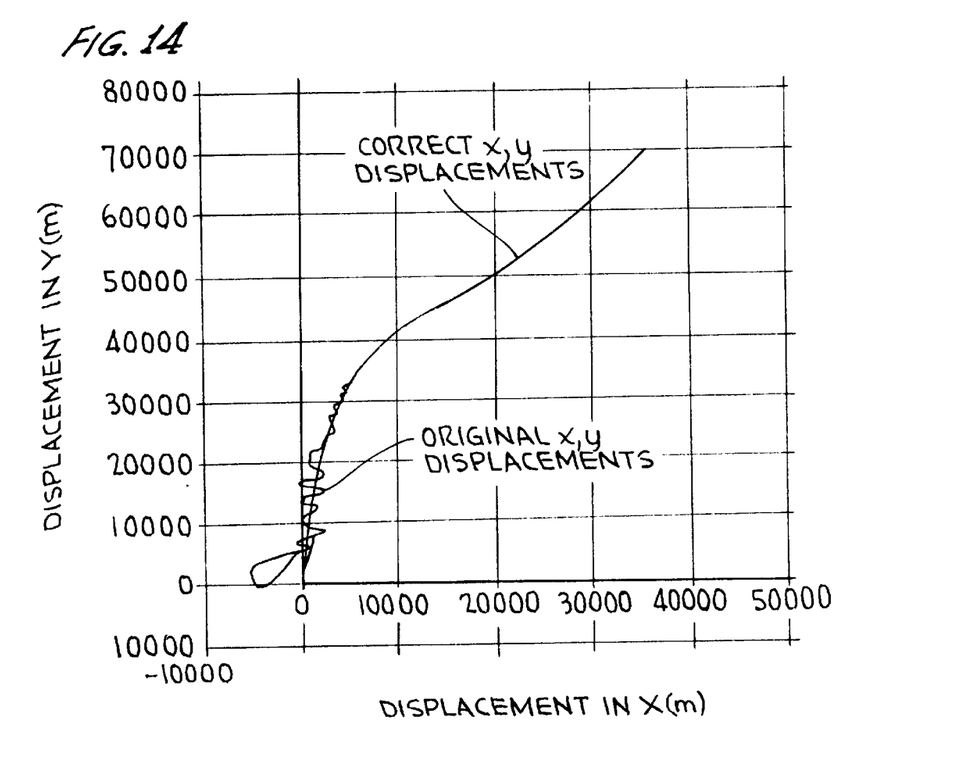
FIG. 14 is an x-y plot of correct values of x, y displacements determined from the same pair of receiver sites plotted in FIG. 13.

Additional information is required to identify which intersection correctly identifies the true coordinates of the sonde x, y. Resolution requires that a third receiver be used and z, r1 and r2 type solutions be determined for each pair according to equations (4), (5) and (6) above. For each pair of receivers and a value of z, plots are made of x and y and of x' and y'. The correct solutions will cluster along a true trajectory path, while the ambiguously incorrect solutions will exhibit scatter, as shown in FIGS. 13 and 14. The clustered points from each receiver pair are averaged, a technique called consensus averaging, to define the sonde location in the x-y plane. To determine the horizontal velocity at each height, tracking filters are used on the five variables: x; y; z; x'; and y'. These can be g-h tracking filters, g-h-k filters or Kalman filters. These types of filters track both position and velocity. Thus the velocities associated with the positions that have clustered as above are themselves averaged to determine sonde horizontal velocity at the given value of z.

Thus, it will be appreciated that there are several distinct methods of using the AOA information derived according to the invention, and in some cases TOA information as well, to locate and track sondes, and thus to determine wind profile information. The approach to measuring the position of a sonde outlined here is general and robust. It applies equally well to fixed, mobile, and deformable base station platforms, and will work equally well with a wide variety of direction finding techniques.

More specifically, it will be recognized by those skilled in the art that while several examples of the present invention have been provided, various modifications and variations may be made without departing from the principles and teachings of the invention as defined by the appended claims. Accordingly, it is intended that those claims should be interpreted as covering all alterations and modifications that fall within the scope of the invention.

What is claimed is:

1. A method for determining wind profile information, comprising the steps of:
providing a plurality of sondes, each comprising a transmitter capable of transmitting a signal modulated according to a predetermined pattern that (1) allows signals received from different ones of said sondes to be differentiated from one another and (2) allows precise measurement of the difference in path length between the sonde and three or more antennas spaced from one another at one or more receiving locations;
releasing said sondes into the atmosphere, for movement with the wind;
operating said sondes to transmit said signals;
receiving said signals at said three or more antennas;
demodulating the signals transmitted thereby at one or more receiving locations to separate the atmospheric data from the modulation pattern;
analyzing the modulation pattern to determine the difference in path length between each sonde and the three or more antennas;
employing said difference in path length to determine an angle of arrival (AOA) of said signal at said receiving location;
determining the location of each said sonde as a function of said AOA, and tracking the positions of said sondes over time to determine the wind profile.

2. The method of claim 1, wherein said transmitted signal comprises atmospheric data including pressure data ambient to the sonde location.

3. The method of claim 2, wherein said ambient pressure data is referenced to a pressure plane established using other measurements to yield a value for the actual altitude of said sonde.

4. The method of claim 1, comprising the step of measuring a carrier phase difference between the signal as received at the spaced antennas, to derive a precise but ambiguous measure of the difference in path length between each sonde and the three or more antennas, and the step of analyzing symbol information in the modulated signal to remove the ambiguity.

5. The method of claim 1, wherein said modulation pattern provides a signal comprising a phase shift keyed, pseudo random sequence of chips of precise length, wherein 1) the pseudo random sequence can be compared to stored sequences to identify the transmitting sonde, and 2) the phase difference between the signal as received at the spaced antennas is used to derive a precise but ambiguous measure of the difference in pathlength.

6. A method for locating a sonde in space at a given instant comprising the steps of:
providing said sonde with a transmitter to send a modulated data signal, including in situ pressure measurements, having a pseudo random sequence of phase-shift-keyed pulses;
receiving said signal at a site comprising at least three closely spaced antennas;
demodulating said received signals to separate data from the modulation pattern;
analyzing the modulation pattern to determine the difference in path length between each sonde and the three or more antennas;
employing said difference in path length to determine an angle of arrival (AOA) of said signal at said receiving location;
determining the altitude of the sonde from the in situ pressure measurement transmitted in the data signal; and
combining the AOA with the pressure-height altitude to locate the sonde in space at a given instant.

7. A method for tracking the trajectory of a sonde by performing the method of claim 6 repeatedly over time.

8. A method for locating a sonde in space at a given instant comprising the steps of:

providing said sonde with a transmitter to send a modulated data signal having a pseudo random sequence of phase-shift-keyed pulses;

receiving said signal at two or more sites each comprising at least two closely spaced antennas, and each time synchronized with the others;

demodulating said received signals to separate data from the modulation pattern;

analyzing the modulation pattern to determine the difference in path length between each sonde and the two or more antennas at each site;

employing said difference in path length to determine an elevation angle of arrival (AOA) of said signal at each site;

analyzing the modulation pattern to determine the difference in time of arrival (TOA) between each sonde and the two or more sites; and combining the AOAs with the TOAs to locate the sonde in space at a given instant.

9. The method of claim 8, wherein plural measurements are made with respect to each site, and consensus averaging is performed with respect to said plural measurements in order to identify the correct sonde location.

10. A sonde signal receiving site apparatus comprising two sonde receiving antennas located to align the phase centers thereof along a vertical axis a known distance apart, said antennas having identical gain patterns independent of azimuth, a GPS antenna collocated therewith to provide timing information, and a support structure for supporting said antennas and for housing associated electronic processing components.

11. A method for tracking the movement of sondes released from a high altitude balloon, comprising the steps of:

providing each sonde with a transmitter capable of transmitting a signal modulated according to a predetermined pattern that (1) allows signals received from different ones of said sondes to be differentiated from one another and (2) allows precise measurement of the difference in path length between the sonde and three or more antennas spaced from one another at one or more receiving locations;

releasing said sondes into the atmosphere, for movement with the wind;

operating said sondes to transmit said signals;

receiving said signals at said three or more antennas;

demodulating the signals transmitted thereby at one or more receiving locations to separate the atmospheric data from the modulation pattern;

analyzing the modulation pattern to determine the difference in path length between each sonde and the three or more antennas;

employing said difference in path length to determine an angle of arrival (AOA) of said signal at said receiving location;

determining the location of each said sonde as a function of said AOA, and tracking the positions of said sondes over time to determine the wind profile.

12. The method of claim 11 wherein at least one of said receiving stations is affixed to said balloon, and said balloon is further provided with precise positioning capability.

13. The method of claim 12 wherein said receiving station affixed to said balloon receives the signal from said sonde, processes said signal to determine the AOA of the sonde with respect to the balloon, and transmits a signal responsive thereto to a ground station.

14. The method of claim 11 wherein said sondes additionally comprise ambient pressure measurement capability, and said transmitters comprised by said sondes additionally transmit said pressure information.

* * * * *